United States Patent [19]

Patterson et al.

[11] Patent Number: 5,288,182
[45] Date of Patent: Feb. 22, 1994

[54] BORING BAR HOLDER AND INSERT WITH PRECISION PLACEMENT INSERT LOCATOR MEANS

[75] Inventors: Harvey L. Patterson, Arcadia; Efren D. Ofalla, El Monte; John G. Harrel, Azusa, all of Calif.

[73] Assignee: Circle Machine Company, Monrovia, Calif.

[21] Appl. No.: 8,633

[22] Filed: Jan. 25, 1993

[51] Int. Cl.⁵ .................................... B23B 31/10
[52] U.S. Cl. .............................. 408/146; 279/67; 408/232; 408/240
[58] Field of Search ............... 408/231, 232, 239 R, 408/240, 238, 146, 713, 233; 279/67, 83, 86, 87, 70, 156

[56] References Cited

U.S. PATENT DOCUMENTS

| | | | |
|---|---|---|---|
| 2,485,799 | 10/1949 | Woytych | 279/67 |
| 2,669,890 | 2/1954 | Tao | 408/232 |
| 3,013,450 | 12/1961 | Yogus | 408/240 |
| 3,091,474 | 5/1963 | Boutros et al. | 279/86 |
| 3,171,665 | 3/1965 | Brauer | 279/67 |
| 3,557,419 | 1/1971 | Flannery | 279/83 |
| 4,573,824 | 3/1986 | Ehle | 279/67 |
| 4,725,173 | 2/1988 | Hoffman et al. | 408/240 |

FOREIGN PATENT DOCUMENTS 26177 of 1906 United Kingdom ............... 279/86

Primary Examiner—Daniel W. Howell
Attorney, Agent, or Firm—Harlan P. Heubner

[57] ABSTRACT

A boring bar holder and removable insert member each equipped with cooperating precision locator means wherein any replacement of the insert within the boring bar holder will index the new insert with precision to the location of the previous insert. There are biasing means associated with the boring bar and the insert to wedgingly move the insert rearwardly to bias against a bore in the boring bar and to index the position of the cutting head of the insert in exact relationship to a previous insert placement.

7 Claims, 2 Drawing Sheets

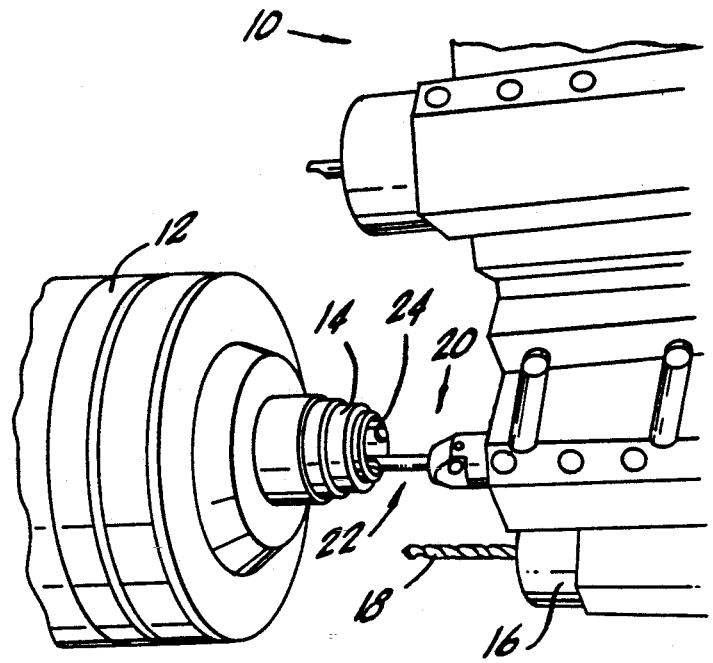
fig.1.
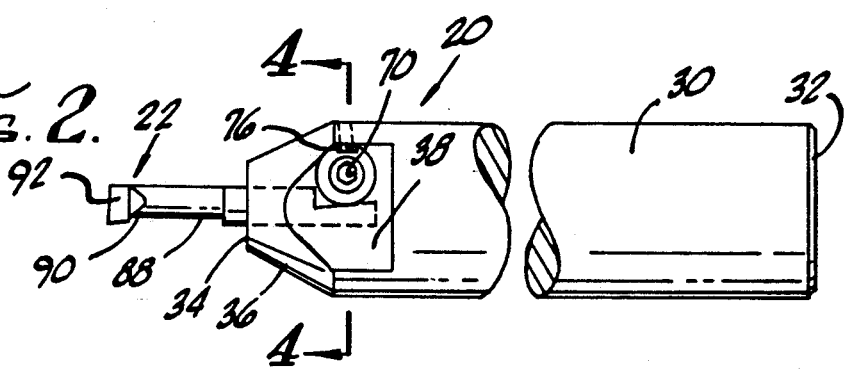
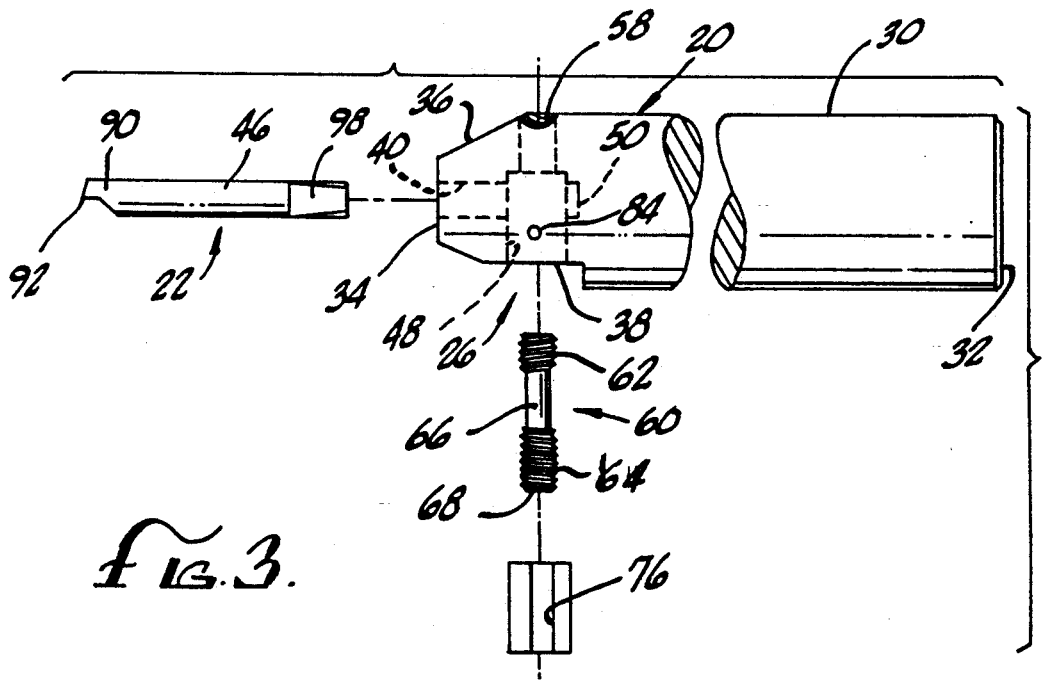
fig.2.
fig.3.

BORING BAR HOLDER AND INSERT WITH PRECISION PLACEMENT INSERT LOCATOR MEANS

BACKGROUND OF THE INVENTION

1. Field of the Invention

This invention relates to a boring bar holder and metal cutting insert having means for relocation or indexing the cutting insert with precision at the angle and location it was before removal or before another insert was removed and replaced.

2. Description of the Prior Art

In the formation of bores in metal parts a machine tool or lathe is usually used. The machine tool includes a work spindle within which there is a combined holder or boring bar and cutting insert. If it was necessary to replace the cutting insert, the whole unit was removed and a new unit inserted. With no way to index it, it was impossible to reinsert the unit exactly as it was.

Next, a manufacturer devised the idea of forming a separate holder or boring bar that was inserted within the spindle. A cutting insert was then separately fabricated and it could be inserted into the boring bar and replaced by a new cutter when the old one become dull. However, the only type of indexing that was done to try to achieve a position close to the previous insert was by flattening one side of the inset and provide a set screw through the boring bar to bias against the flat surface. However, this was not accurate because the set screw only engaged a small area of the flat and further there was no assurance that the end of the insert would engage the back wall of the insert hole to assure stability of the insert during rotation and cutting.

Thus prior to the present invention there were no boring bar insert combinations to achieve the desired exact placement or indexing nor the locking of the insert where movement is prevented during use.

SUMMARY OF THE INVENTION

It is a purpose of the present invention to provide a boring bar and replaceable cutting insert wherein the boring bar may remain in a work spindle and the insert may be removed and replaced with almost perfect location and precision due to structure of the insert as well as in the boring bar.

It is an object of the present invention to provide a boring bar with insert engaging biasing means to engage an insert, locking the same against axial or lateral movement, and to index the same to a position within 0.002" of an insert's previous position.

Another object of the present invention is to provide a boring bar with insert engaging biasing means and a cutting insert with biasing means engageable with the boring bar biasing means to assure a locked position indexed to within a fraction of an inch to previously inserted cutting insert.

A still further object of the present invention is to provide a boring bar with insert engaging biasing means and a cutting insert wherein there is a set screw and a biasing collar threadably shiftable with said boring bar to enable the biasing collar to engage the insert and lock the same against movement when at rest or rotating in a spindle and cutting.

A yet another object of the present invention is to provide a boring bar with insert engaging biasing means and a cutting insert as in the next above object where the biasing collar includes a guide way within which a guide pin rides to prevent rotation of the collar yet allow the same to slidingly shift within the boring bar.

These and other objects and advantages will become apparent from the following part of the specification wherein details have been describe for the competence of disclosure, without intending to limit the scope of the invention which is setforth in the appended claims.

BRIEF DESCRIPTION OF THE DRAWINGS

These advantages may be more clearly understood from the following detailed description and by reference to the drawings in which:

FIG. 1 is an environmental view of the present invention as it might be used in a metal cutting machine;

FIG. 2 is a side elevational view of the present invention of a boring bar and cutting insert;

FIG. 3 is a top elevational exploded view of the present invention illustrating biasing means to lock the cutting insert within the boring bar;

DETAILED DESCRIPTION OF THE PREFERRED EMBODIMENT

Figures 4A, 4B:
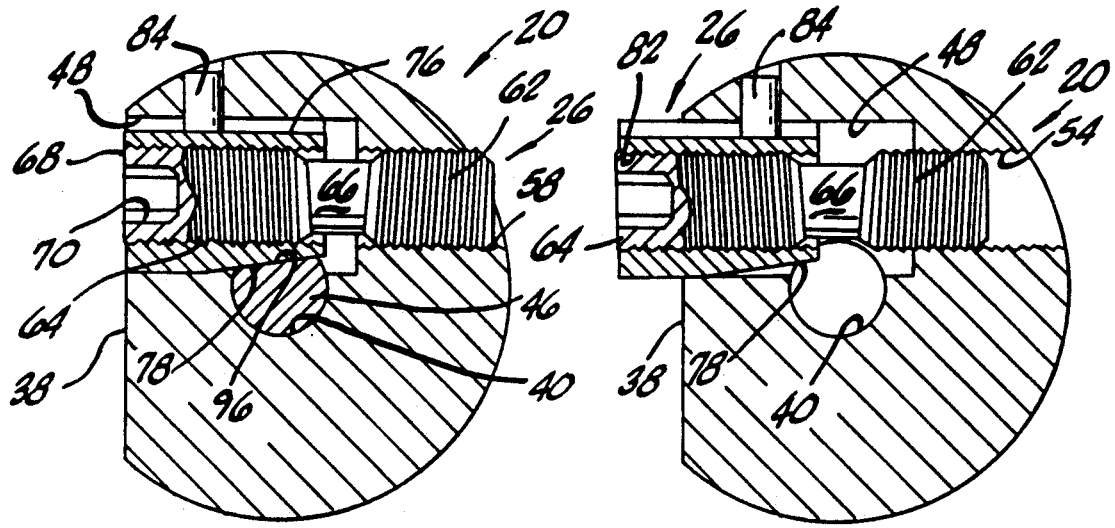
FIG. 4A is a view taken on line 4—4 of FIG. 2 with the biasing means locking the cutting insert in place.
FIG. 4B is a view also taken on line 4—4 of FIG. 2 but with the biasing means open and the cutting insert removed.

In FIG. 1 there is illustrated a machine tool generally designated 10 which may be used to cut annular holes in metal parts. The tool 10 usually includes a work spindle 12 to which is secured a metal work piece 14. There is also a tool holder 16 of any conventional type possessed of chucks to hold tools such as a drill 18 or boring bar holder designated 20. The boring bar 20 is fitted with a metallic cutting insert member designated 22. The insert 22 is positioned to engage the work piece 14 and as the piece is rotated a bore or opening 24 is formed in the work piece 14.

Boring bar holder means 20 have been used for some time. Initially the holder means 20 included an integrated insert such as 22. The holder means 20 would be mounted in the chuck (not shown) of a tool holder 16. However, such construction was costly and when the cutting insert became dull the entire unit had to be replaced.

Subsequently, a boring bar holder means was designed wherein there was a bore in the means and an insert was formed separately and held in place by a set screw.

Neither of the above two prior art structures proved satisfactory because of the failure to provide any way to index or position the cutting insert to the exact same position as was its predecessor. When drilling bores in work pieces precision and exacting tolerance may be essential.

Later the cutting inserts were formed with non-round diameters to be keyed into complementary opening in boring bar holders. However such devices still lacked the necessary structure for true precision settings.

In the present disclosure there is provided a precision locator means designated 26 formed within the boring bar holder 20 and structure on the cutting member 22.

The boring bar holder 20 preferably includes an annular metallic elongated shank portion 30 that is mounted within the conventional tool holder 16. The shank includes a rear end 32 and a front end 34. The shank 34 may be of less surface than the rear end 32.

Adjacent the front end 34 the shank 30 is cut out forming a flattened set screw receiving surface 38.

Projecting into the shank 30 from front end 34 is a cutting insert receiving bore 40, best seen in FIGS. 3 and 4B. The diameter of the bore 40 is slightly larger than the diameter of the annular cutting insert shank 46.

Figure 5:
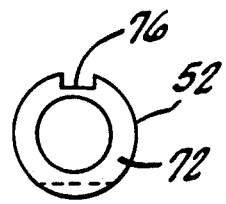
FIG. 5 is an end view of a biasing collar mounted in the boring bar to assure a biasing of the cutting insert to lock the same in position.
Figure 6:
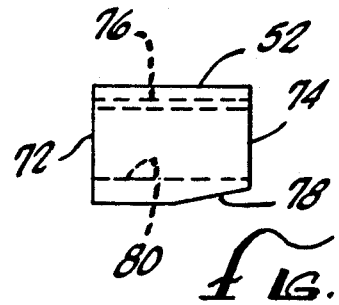
FIG. 6 is a side elevation of the biasing collar of FIG. 5.
Figure 7:
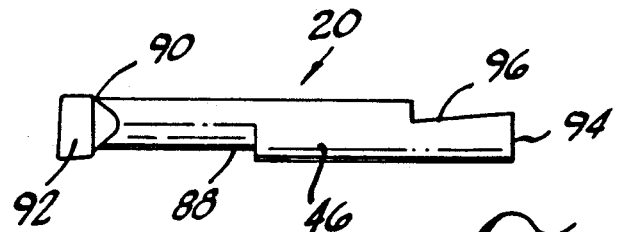
FIG. 7 is a side elevational view of the cutting insert.

Formed in the boring bar shank 30 from the flattened set screw surface 38 through the diameter and above the bore 40 is a annular bore 48. The bore adjacent the flattened surface 38 is smooth to receive a sliding wedge clamp collar 52, see FIGS. 5 and 6, to be described.

The bore 48 is reduced in diameter beyond the central axis x of the shank and is fitted with left hand threads 54.

The bore 48 is above and normal to cutting insert bore 40 which may partially intersect bore 48 and terminates inwardly of bore 48 at end 50.

The precision locator means 26 also includes a threaded set screw designated 60. The screw included an inner left hand threaded portion 62 and an outer right hand threaded portion 64 with a smooth annual reduced diameter center section 66 therebetween. The threaded end 62 is adapted to be threadably received in the reduced diameter of bore 48.

The end 68 of the threaded set screw 60 is provide with an opening 70 such as an opening to receive an Allen wrench to rotate the screw 60.

Turning now to the wedge clamp collar 52, it is an annular collar having a front end 72 and rear end 74. Longitudinally along the exterior of the wall a key way 76 is provided.

Diametrically oppose the keyway 76 the collar exterior surface is cut upwardly from about midway the length of the collar 52 to the inner end 74 forming a flat wedge biasing surface 78. This surface 78 is adapted to bear against the cutting insert 20 to locate the same in the exact position as a previously removed insert. The details of such wedging will be discussed below.

The interior 80 of the collar 52 is formed with right hand threads 82. These threads 82 are to mate with and be threadable on the outer right hand threaded portion 64 of the set screw 60.

Projecting into the bore 48 is guide and key pin 84 which is adapted to project into the keyway 76 to prevent rotation of the collar 52 when the screw 60 is rotated into the bore 48. In other words rotation of the threaded set screw 60 in either a clockwise or counter clockwise direction within the bore 48 will, allow the wedge clamp collar 52 to slide in and out within the bore. See FIGS. 4A & 4B for the locked inward position and the unlocked outward position.

The cutting insert member 22 is generally a conventional member with an elongated shank 46, a forward stepped portion at the cutting end 90. The cutting end 90 is formed into a conventional metal cutting blade 92. At the rear end 94 of the shank 46 a locking cut out 96 is formed. The cut out 96 tapers downwardly from end 94 and the cut out forms a flat wedge surface 98.

In operation, a boring bar holder 20 is selected as is an appropriate metal cutting insert member 22. The threaded set screw 60 is threaded out of the boring bar 20 by an Allen wrench seated in opening 70 to rotate and unscrew the set screw 60. FIG. 4B illustrates the set screw 60 backed out of the bore 48 so that bore 40 is open.

Next the insert member 22 is inserted into the cutting insert bore 40 until it is seated with end 94 against the rear end 50 of the bore 40 with the biased locking cut out 96 positioned upwardly as seen in FIGS. 2 and 4A. At that point the cut out 96 is positioned slightly below the biasing surface 78 of the wedge clamp collar 52.

As the screw 60 is rotated and moves inwardly into bore 48 the biasing surface 78 will engage the flat wedge surface 98 and rotate the insert 22 slightly so the surface 98 has greater exposure to the biasing surface 78 for bearing contact.

Due to the tapering or biasing of surface 98 and 78 as the set screw 60 is moved inwardly the insert 20 will be urged downwardly against bore 40 and against end 50 of bore 40 rearwardly to lock the insert and bias it as seen in FIG. 4A. At the same time with the tightening of the screw the insert 22 is locked against any lateral or rotational movement during use.

The machine 10 may be advanced and the appropriate cutting of the work piece 14 takes place. The precision locator member 26 will hold the insert 22 with such tightness that during rotation and work process it will not become loosened.

When the cutting head 92 becomes dull and needs replacing, the boring bar 20 is left in the chuck and the precision locator member 26 is unscrewed as seen in FIG. 4B, the insert 22 is removed and a new insert member 22 is placed in the bore 40.

With the tighten of the screw 60, the new insert 22 is moved to a position almost exactly as the former insert. Generally the positioning is within 0.002 inch of the previous insert 22. This then will enable the continued work of forming the bore or opening 24 in the work piece without disrupting settings and tolerances set for the particular cutting job.

The invention and its attendant advantages will be understood from the foregoing description and it will be apparent that various changes may be made in the form, construction and arrangements of the parts without departing from the spirit and scope thereof or sacrificing its material advantages, the arrangements herein before described being merely by way of example. We do not wish to be restricted to the specific forms shown or uses mentioned, except as defined in the accompanying claims, wherein various portions have been separated for clarity of reading and not for emphasis.

We claim:

1. Precision placement insert locator means for positioning a replaceable metal cutting insert member in a boring bar in the same location each time an insert is placed in said boring bar, said boring bar has an elongated shank to be mounted in a tool holder of a cutting machine, and said insert has a cutting head adapted to cut an opening in a work piece held in said cutting machine, said locator comprising:

said metal cutting insert having an elongated annular shank with a rear end and a front end, said front end having said cutting head, and a locking cut out including a flat wedge surface formed in said shank extending inwardly and downwardly from said rear end forming part of said locator means, and said annular shank is insertable in an insert bore; and said boring bar has a forward section with a bore to receive said insert and an additional cooperating part of said locator means to receive said replaceable metal cutting insert member, said locator means including a set screw bore and threadable set screw means mounted in said forward section normal to said insert bore and in communication therewith, a wedge clamp collar having a flat surface mounted on said set screw means adapted to move into precise flat to flat wedging locking engagement with said flat wedge surface of said insert when said insert is mounted in said insert bore, yet slidably movable out of contact with said insert wherein said insert may be removed and replaced in the corresponding position as the insert removed.

2. Precision placement insert locator means as defined in claim 1 wherein:

said insert bore includes a rear end; and said wedge clamp collar when engaging said flat wedge surface biases said cutting insert downwardly to lock said insert against said insert bore as well as simultaneously biasing said insert in the direction of said upward angled surface rearwardly against said rear end of said insert bore to maintain said cutting insert in a position identical with a previously mounted cutting insert and to prevent dislodgement during cutting.

3. Precision placement insert locator means as defined in claim 2 wherein:

said wedge clamp collar is annular having an inner and outer end and includes a generally flat biasing surface extending upwardly and outwardly toward said rear end; and said generally flat biasing surface when said wedge clamp collar is moved inwardly in said set screw bore will engage an edge of said flat wedge surface cut out whereby with progressive movement into said set screw bore will cause said cutting insert to rotate precisely to a position where at least a portion of each flat surface will engage the other for precision reset alignment of said cutting insert with that of a previous cutting insert.

4. Precision placement insert locator means as defined in claim 3 wherein:

said set screw bore includes a guide key pin projecting into said set screw bore;

said wedge clamp collar is internally threaded onto said set screw for lateral movement in said set screw bore; and said wedge clamp collar opposite said generally flat biasing surface includes a key way in said collar, and said guide key pin is adapted to ride in said key way whereby rotation of said set screw will cause in and out sliding movement of said wedge clamp collar.

5. Precision placement insert locator means as defined in claim 4 wherein:

said set screw bore includes a smooth section projecting inwardly from one side of said boring bar shank of one diameter in which said wedge clamp collar slidably rides and a forward threaded bore section extending out the opposite side of said shank;

said set screw means includes a first threaded section in one direction, a second threaded section in an opposite direction and is adapted to be threaded into said forward threaded bore section and a center section joining said first and second threaded sections of a diameter less than that of either of said threaded sections; and said wedge clamp collar having internal threads to be threaded onto said first threaded section.

6. In a boring bar having an elongated annular shaft, a front and rear end and a cutting insert bore extending inwardly from said front end, said boring bar to be mounted in a tool holder of a metal cutting machine, and a cutting insert member having a metal cutting head for performing metal cutting operations and a rear end wherein said cutting insert is replaceable and said head will cut an opening in a work piece held in said metal cutting machine, the improvement including:

precision placement insert locator means for positioning a replacement metal cutting insert member within said boring bar without removing said boring bar and lockably maintaining said insert within a small tolerance of the placement of a predecessor metal cutter insert, said means including biasing elements on both said cutter insert and said boring bar to lockably and with precision wedge said cutter insert within said boring bar to prevent movement of said insert while said insert is performing a metal cutting operation;

a locking cut out in said cutting insert that includes a flat wedge surface angled upwardly and outwardly toward said rear end; an additional cooperating set screw and wedge clamp collar means mounted in said boring bore wherein said wedge clamp collar may engage said locking cut out to bias said cutting insert in a position as was a previously removed cutting insert, and said wedge clamp collar when engaging said flat wedge surface biases said cutting insert downwardly to lock said insert against said set screw insert bore as well as simultaneously biasing said insert in the direction of said upward angled surface rearwardly against said rear end of said insert bore to maintain said cutting insert in a position identical with a previously mounted cutting insert and to prevent dislodgement during cutting.

7. In a boring bar combination of clamp 6 wherein:

said wedge clamp collar is annular having an inner and outer end and includes a generally flat biasing surface extending upwardly and outwardly toward said rear end; and said generally flat biasing surface when said wedge clamp collar is moved inwardly in said set screw bore it will engage an edge of said flat wedge surface cut out whereby with progressive movement into said set screw bore will cause said cutting insert to rotate precisely to a position where at least a portion of each flat surface will engage the other for precision reset alignment of said cutting insert with that of a previous cutting insert.

* * * * *